United States Patent [19]

Battlogg

[11] Patent Number: 5,428,859
[45] Date of Patent: Jul. 4, 1995

[54] WINDSHIELD WIPER SYSTEM WITH EXTENDABLE WIPER ARM AND PIVOTABLE WIPER BLADE

[76] Inventor: Stefan Battlogg, No. 26, St. Anton i/M, 6771, Austria

[21] Appl. No.: 157,193

[22] Filed: Dec. 8, 1993

[30] Foreign Application Priority Data

Jun. 18, 1991 [AT] Austria .................. 1222/91

[51] Int. Cl.⁶ .............. B60S 1/36; B60S 1/06; B60S 1/20
[52] U.S. Cl. .............. 15/250.21; 15/250.23; 15/250.24
[58] Field of Search ........... 15/250.21, 250.23, 250.35, 15/250.24, 250.25, 250.22, 250.13

[56] References Cited

U.S. PATENT DOCUMENTS

| | | | |
|---|---|---|---|
| 2,607,065 | 8/1952 | Dahlgren | 15/250.23 |
| 2,624,904 | 1/1953 | Wianco | 15/250.23 |
| 2,629,891 | 3/1953 | Green | 15/250.23 |
| 2,738,536 | 3/1956 | Spencer, Jr. | 15/250.23 |
| 2,790,195 | 4/1957 | Wrobel | 15/250.23 |
| 3,688,334 | 9/1972 | Peterson | 15/250.23 |
| 4,639,966 | 2/1987 | Kuhbauch | 15/250.23 |
| 4,815,159 | 3/1989 | Kuhbach | 15/250.23 |
| 4,949,420 | 8/1990 | Eustache | 15/250.23 |

FOREIGN PATENT DOCUMENTS

| | | | |
|---|---|---|---|
| 2507314 | 9/1976 | Germany | 15/250.23 |
| 81240 | 5/1984 | Japan | 15/250.23 |
| 2225218 | 5/1990 | United Kingdom | |

*Primary Examiner*—Gary K. Graham
*Attorney, Agent, or Firm*—Herbert L. Lerner; Laurence A. Greenberg; Werner H. Stemer

[57] ABSTRACT

A windscreen-wiper system in which a wiper blade is rotatably mounted on a telescopically extendable part of the wiper arm and can be moved, lying substantially flat, laterally over the vehicle windscreen. The drive producing the pivoting motion of the wiper arm is transmitted to the wiper arm via two cable lines, the first of which causes the wiper blade to rotate when its two lengths of cable move relative to each other. The second cable line is used to alter the length of the wiper arm. It consists of paying-out a cable which passes over a first pulley driven by the wiper arm pivoting motion drive and over a second pulley mounted on the lower part of the wiper arm, and is attached to the telescopic part of the wiper arm, and a pulling-in cable which is made up of both the lengths of cable (8,9) and passes from the pulley (10) mounted on the telescopic part of the wiper arm back to the driven pulley (18).

12 Claims, 9 Drawing Sheets

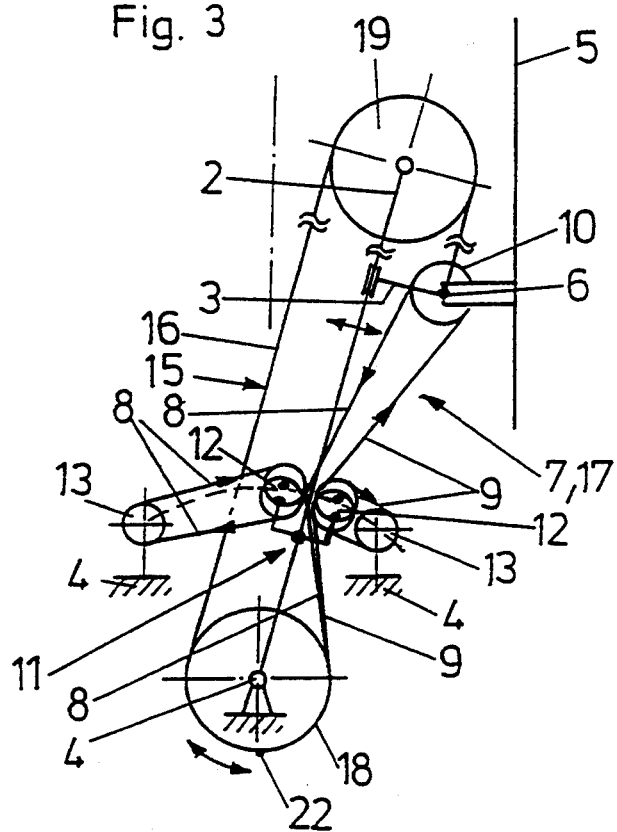
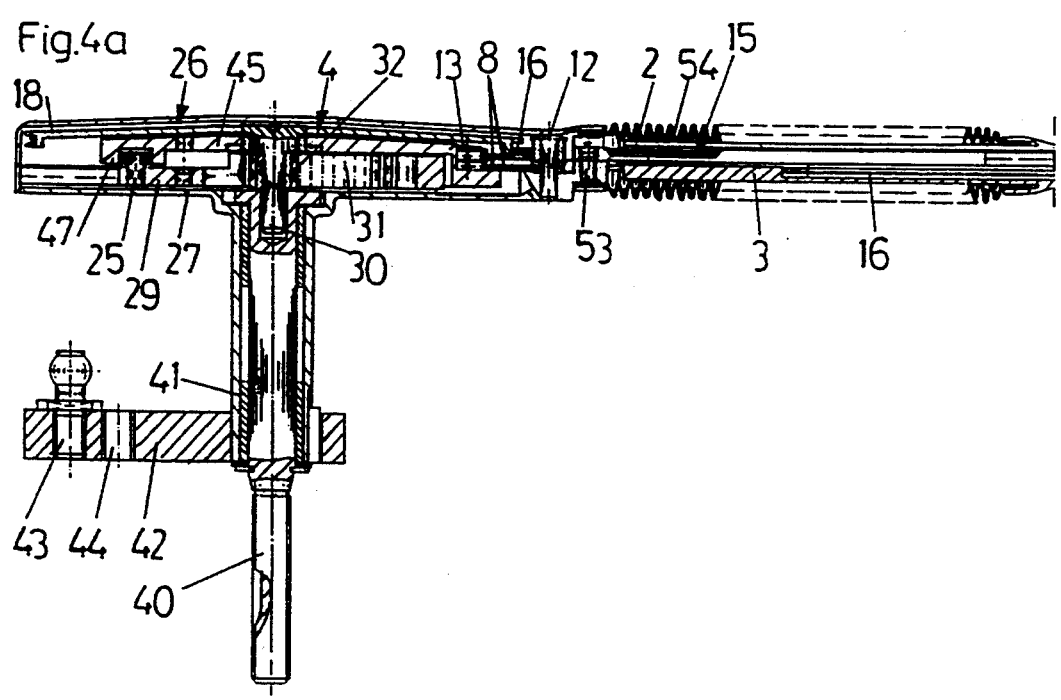

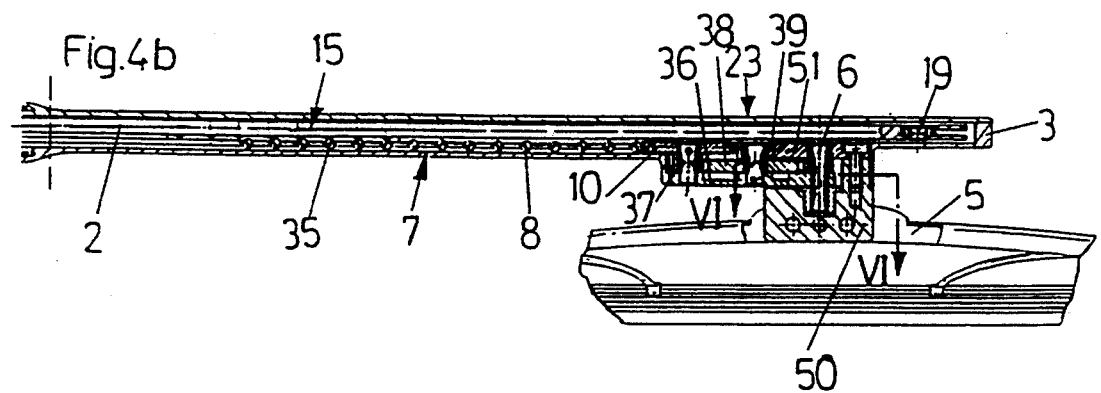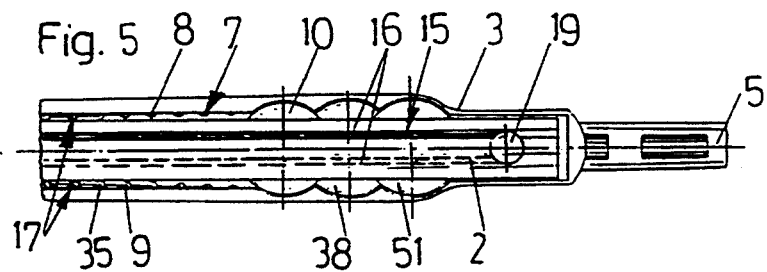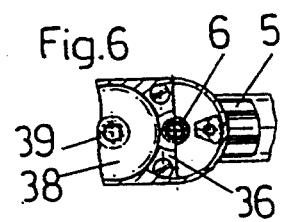

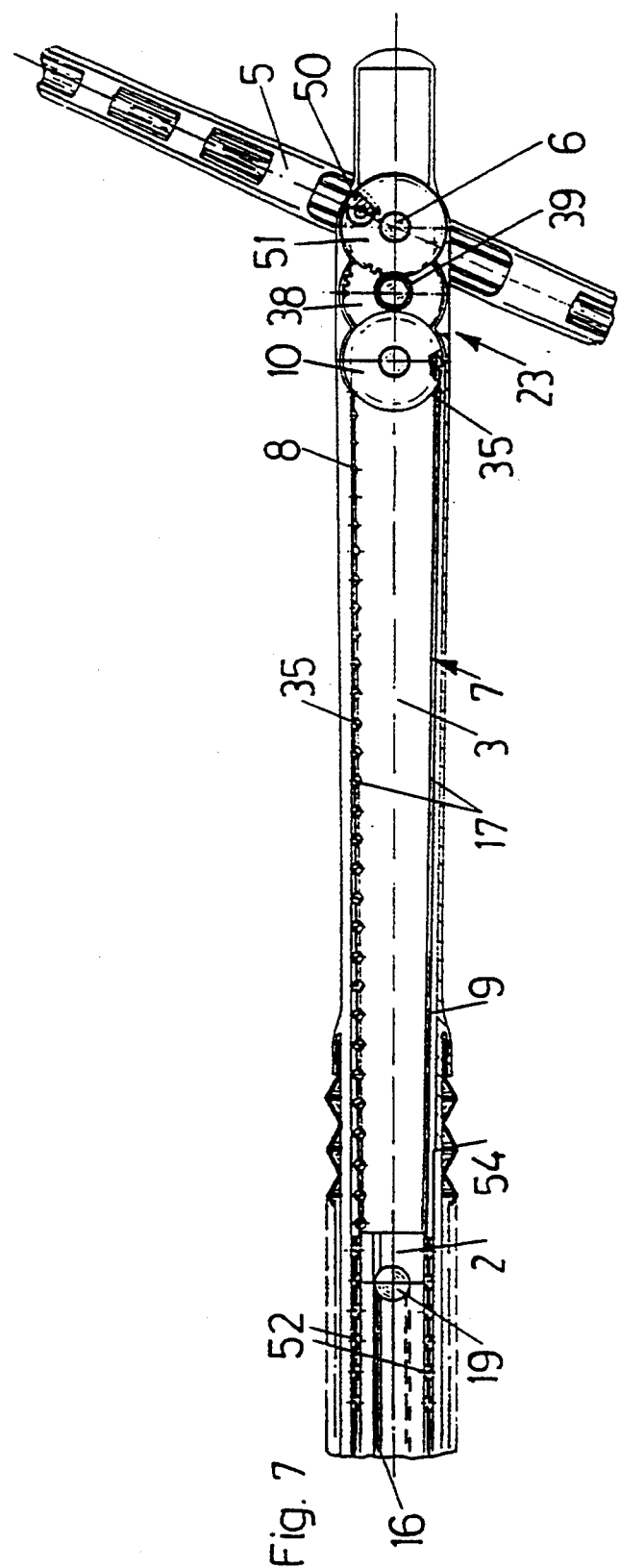

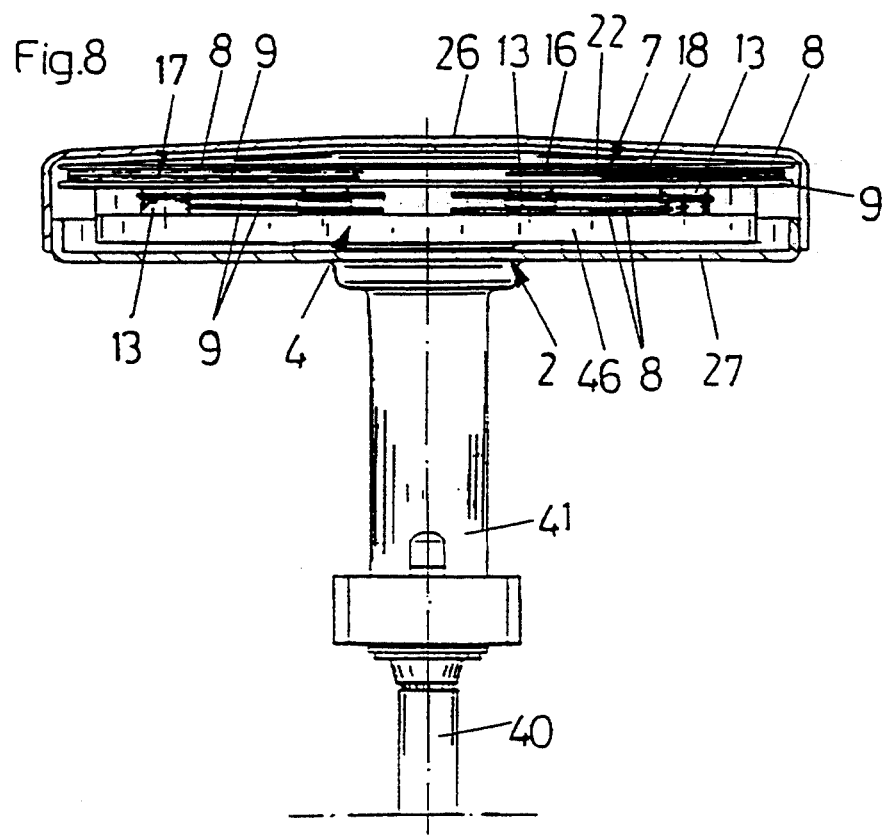
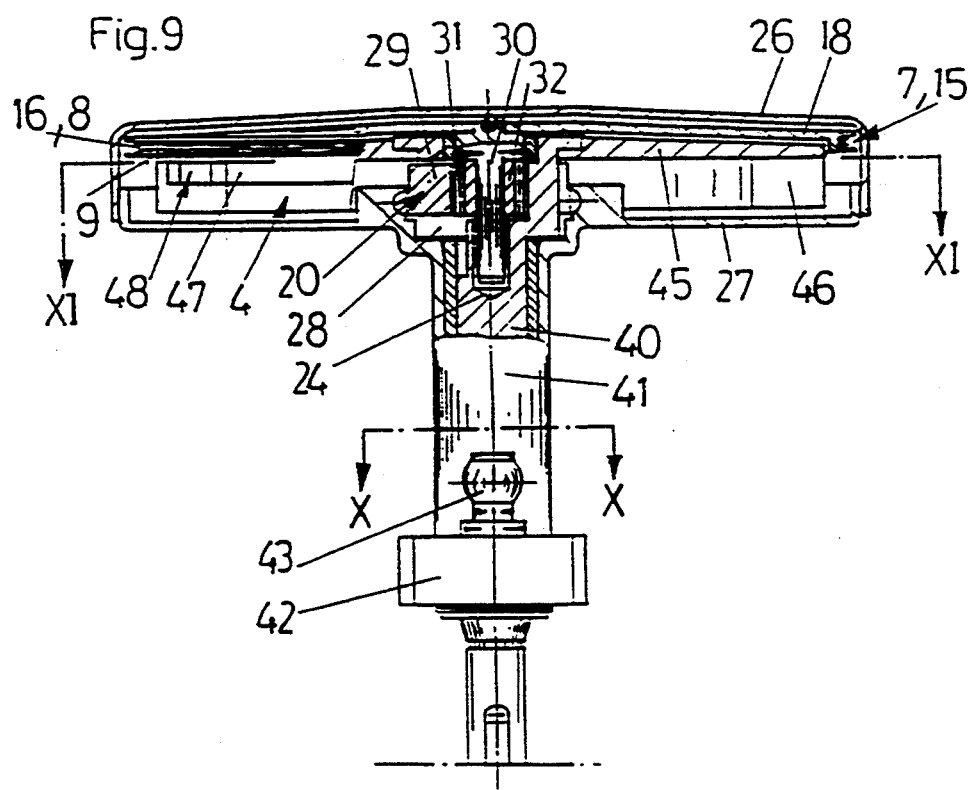

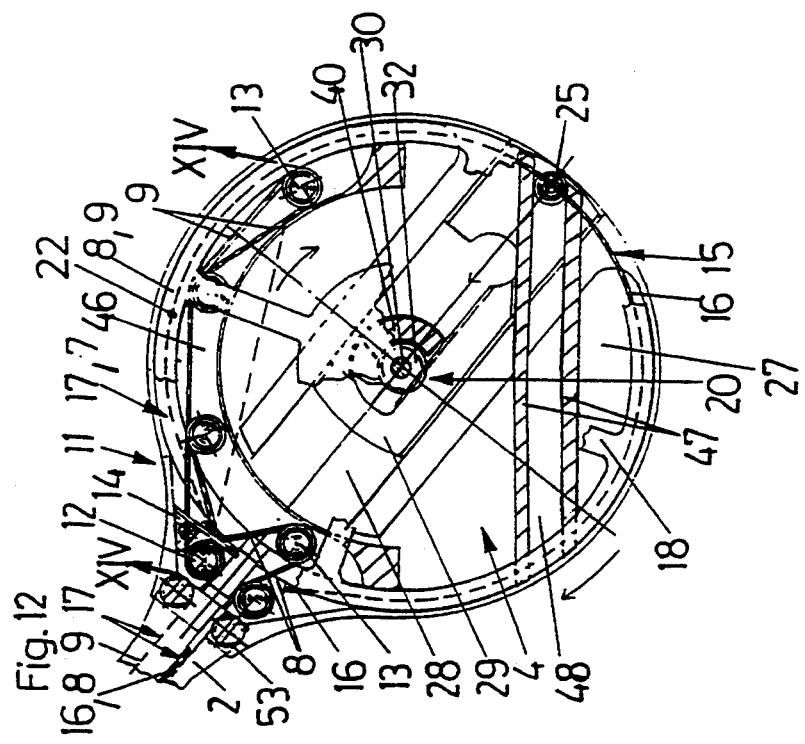
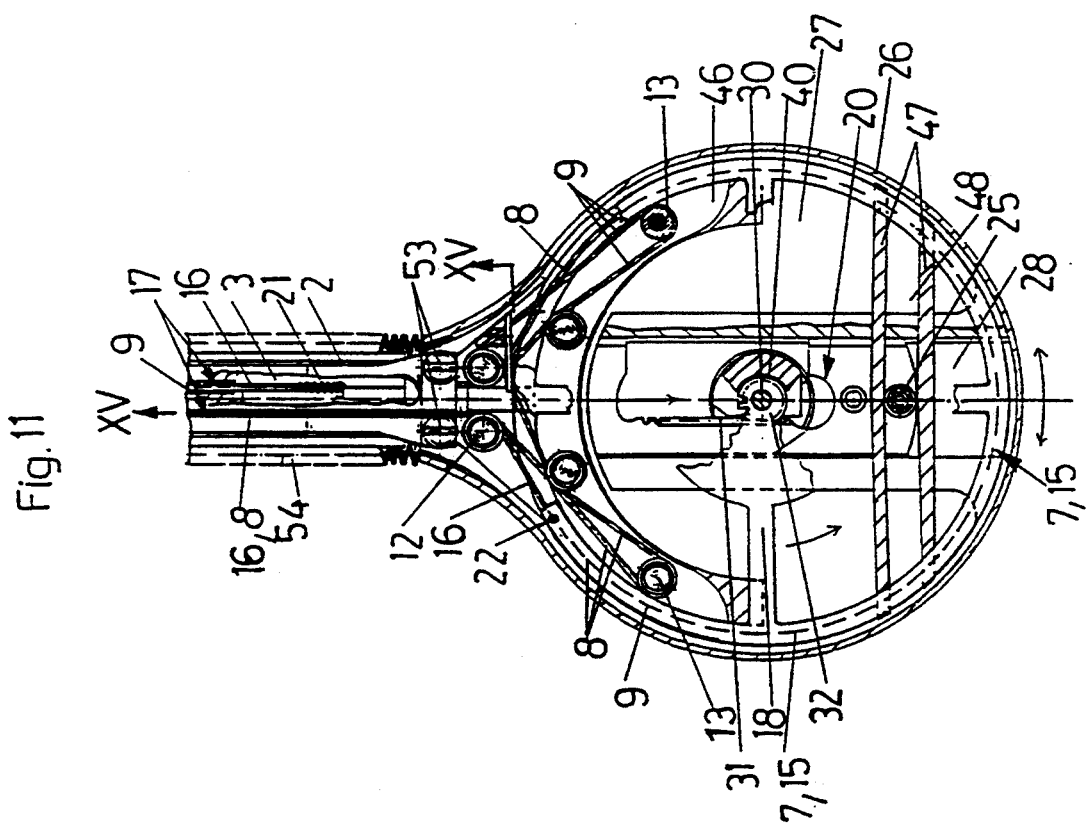

WINDSHIELD WIPER SYSTEM WITH EXTENDABLE WIPER ARM AND PIVOTABLE WIPER BLADE

BACKGROUND OF THE INVENTION

FIELD OF THE INVENTION

The invention pertains to a windshield wiper system, in particular for passenger vehicles, with a wiper arm having a pivot drive and comprising at least two telescopically shiftable members, with a wiper blade pivotally mounted at a free end of the shiftable wiper arm member and guidable transversely across substantially the entire surface of the windshield, with a cable line having two cable lengths between a cable pulley associated with the wiper blade and a base part effecting the pivoting of the wiper blade, with a second cable drive for extending the extendable wiper arm member, the drawing-in of which is effected by the first cable line, and with a cable storage for receiving and issuing the section of each cable length of the first cable line corresponding to the wiper arm length difference.

Such a windshield wiper system is described, for instance, in AT-PS 392 942. The sections of the two cable lengths corresponding to the length of the wiper arm are wound onto two cable pulleys which are driven in contrary directions and which are disposed in the pivot bearing either next to one another or above one another. The extension is effected by means of a helical spring acting on the shiftable wiper arm instead of which a second cable line, which is not discussed in detail, can be provided.

The bearing axes of the two cable pulleys do not change their position during the oscillation and therefore form the above-mentioned base part, relatively to which the wiper arm is pivoted and which causes the rotation of the pulley, which attains an at least nearly parallel movement of the wiper blade. This leads particularly to constructional problems in terms of dimensioning of the windshield wiper and, in particular, of the wiper arm, which should or must have a cross-sectional width as little view-obstructive as possible and, if a tension spring surrounding the wiper arm is provided, in terms of the continuous spring action and in that the spring is itself surrounded by a bellows. Since the wiper blade is to wipe the full surface of the windshield, the shape of the windshield determines the accuracy of the parallel guide. In the case of a rectangular windshield, it is exact; due to the fact, however, that most windshields have oblique edges, i.e. they are trapezoid, the wiper blade is subject to a slight rotation by a few degrees during the wiping oscillation.

The invention is based on the object to provide dimensions, in a windshield wiper system of the above-mentioned kind, in particular the width and the height (perpendicular to the windshield) of the wiper arm and its pivot bearing as small as possible.

This is attained, in accordance with the invention, in that the second cable line comprises a push-out cable which is guided from a driven first cable pulley mounted in the pivot bearing of the wiper arm, via a second cable pulley disposed at a constant distance from the first cable pulley on the pivoted wiper arm member, to the extendable wiper arm member, and a draw-in cable which is guided back from the extendable wiper arm member to the driven first cable pulley, whereby the first cable line is formed in one of the two cables of the second cable line.

Guiding the second cable line via two fixedly spaced-apart cable pulleys reduces the width and the height of the wiper arm, because the two cables of the second cable line can be guided inside the wiper arm as well, and it reduces the height of the pivot bearing, because only a single driven cable pulley must be accommodated.

In a first preferred embodiment, the cable storage for the first cable line includes a segment of the periphery of the driven first cable pulley. In spite of the rotation of the driven cable pulley about the pivot axis, the orientation of the wiper blade is maintained, since both cable lengths are drawn-in and released by the same amount.

Guiding the two cable lengths of the first cable line to the cable-storing peripheral segment is, in principle, possible in various ways, whereby at least one cable length can possibly also be guided about a guide roller, in order to attain the same draw-in direction and release direction for both cable lengths. A structurally simple embodiment, however, provides for a common feed of the two cable lengths of the first cable line into the cable-storing peripheral segment of the driven cable pulley.

For the purpose of maintaining the diameter of the driven first pulley as small as possible, the cable-storing peripheral segment extends about a largest possible arc. The angle of rotation of the cable pulley is thus larger than the pivot angle of the wiper arm between its two reversal positions. An additional drive for the cable pulley is obviated in that a transmission gearing is formed between the pivot drive of the wiper arm and the driven first cable pulley of the second cable line disposed in the pivot bearing of the wiper arm.

Starting out from a center position of the wiper arm, in which it has the shortest length, the wiper arm is extended up to the reversal position and again retracted to the center position. The same movements take place in pivoting in the other direction. The cable pulley is controlled via the transmission gearing in this manner, whereby, preferably, there is provided, a toothed rack which is guided in the pivoted wiper arm member, which meshes with a pinion of the cable pulley, and which is moved along a chord-like guide track in the pivot bearing. Accordingly, any pivoting of the wiper arm from the center position to the reversal position and back into the center position, effects a rotation of the driven first cable pulley in both directions.

In a preferred embodiment it is provided that the two cable lengths of the first cable line are guided through a device for variable loop formation, which comprises guide rollers which are movable relative to one another and which effect the pivoting of the wiper blade. The device for variable loop formation preferably also forms the basic part, the position of which is thus independent of the driven first pulley, which, again, has an advantageous effect on the dimensions of the windshield wiper system. The cable length changes effected in the device for loop formation can be adapted to the pivot angle of the wiper blade if a reduction gearing is provided between the pulley and the pivot bearing. Additionally, it can equalize great cable length changes which is particularly advantageous when the device for variable loop formation includes two first guide rollers associated with the pivot bearing and two second guide rollers disposed at the pivoted wiper arm member, so that a hoist-like cable deflection is provided through which the external forces and torques acting on the wiper blade are transferred in a reduced fashion onto the parts of the transmission gearing between the driven cable pulley of the second cable line and the pivot drive of the wiper arm.

In a first embodiment, the two first guide rollers are disposed on the pivot bearing at an angle relative to the pivot axis which is, in particular, greater than the pivot angle of the wiper arm. An arc-shaped sliding guide for the cable lengths of the first cable line may be provided between the two first guide rollers, so that the loop formation and loop variation changes the two cable lengths of the first cable line by the same amount in correspondence with the pivot angle of the wiper arm. Several first guide rollers may be provided along the arc for the purpose of reducing friction, whereby the difference between the partial lengths of the arc between the two first guide rollers and the respective pivot lengths can be neglected. The error becomes smaller, the more closely the first guide rollers are disposed next to one another.

In a second embodiment, the two first guide rollers are also disposed on the pivoted wiper arm member, but shiftable in length, and a control surface is provided at the pivot bearing whose orientation determines the shifting of the guide roller pair. A control pin connected with the guide roller carrier senses the control surface during the pivoting, which control surface is preferably formed in a plane, resulting in a steady pivoting of the wiper blade. At least segments of the control surface, however, may also be curved if an "uneven parallel guide" is required.

A further preferred embodiment provides for the two cable lines to consist of a single cable, which—as the push-out cable—is guided from the fixed point of the first cable end at the extendable wiper arm member, via the second cable pulley, to the driven first cable pulley, and—as the draw-in cable comprising the two cable lengths of the first cable line—from the driven first cable pulley, via a first guide roller and a second guide roller, to the pulley at the extendable wiper arm member, and via a further first guide roller and a further second guide roller back to the driven first cable pulley, at which the fixed point for the second cable end is disposed in the entrance region for the push-out cable leading from the second cable pulley to the first cable pulley. Depending on the embodiment, the cable can be guided about additional first and/or second guide rollers.

The invention will now be described in more detail by means of the figures of the enclosed drawings:

BRIEF DESCRIPTION OF THE DRAWINGS

FIGS. 2 and 3 are schematic illustrations of the two cable lines in a first embodiment in two different wiper arm positions, FIGS. 4a and 4b show a longitudinal section through a windshield wiper with a drawn-in wiper arm, FIG. 5 is a plan view onto the free end of the wiper arm according to FIG. 4, FIG. 6 shows the region of the pivot bearing of the wiper blade in a section according to the line VI—VI of FIG. 4b, FIG. 7 is a plan view onto the free end of the wiper arm in the case of an extended wiper arm, FIGS. 8 and 9 are partially sectioned views of the pivot bearing from the side of the wiper arm and from the opposite side.

DESCRIPTION OF THE PREFERRED EMBODIMENT

Figure 1:
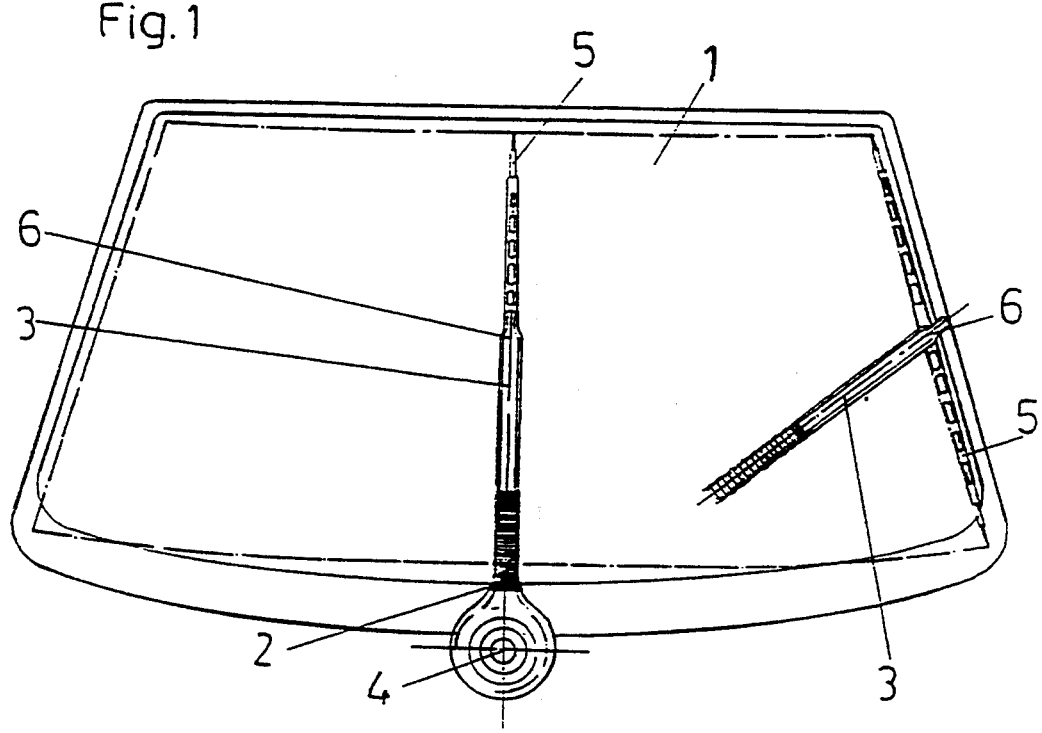
FIG. 1 is a plan view of a windshield with a windshield wiper system according to the invention.

As seen in FIG. 1, the windshield wiper system includes one wiper arm which is pivoted about a pivot bearing 4 disposed approximately centrally below the vehicle windshield 1. The wiper arm comprises two telescopically shifted members 2 and 3, of which the wiper arm member 2 is mounted on the pivot bearing 4 and the wiper arm member 3 carries a pivot bearing 6 for a wiper blade 5 at its free end. During the oscillation of the wiper arm the wiper blade 5 is pivoted or guided such that the full surface of the windshield 1 is wiped. Depending on the surface of the windshield 1, therefore, the wiper blade 5 is subject to an approximately parallel guide. As can be seen from the right-hand side of FIG. 1, two movements must be coordinated for that purpose, namely extending the wiper arm members 2 and 3 and pivoting the wiper blade 5, always as a function of the pivot angle of the wiper arm. In an effort to maintain the cross-sectional measurements of the wiper arm as small as possible, these movements are effected with the aid of cable lines 7 and 15 which are guided within the wiper arm.

Figure 2:
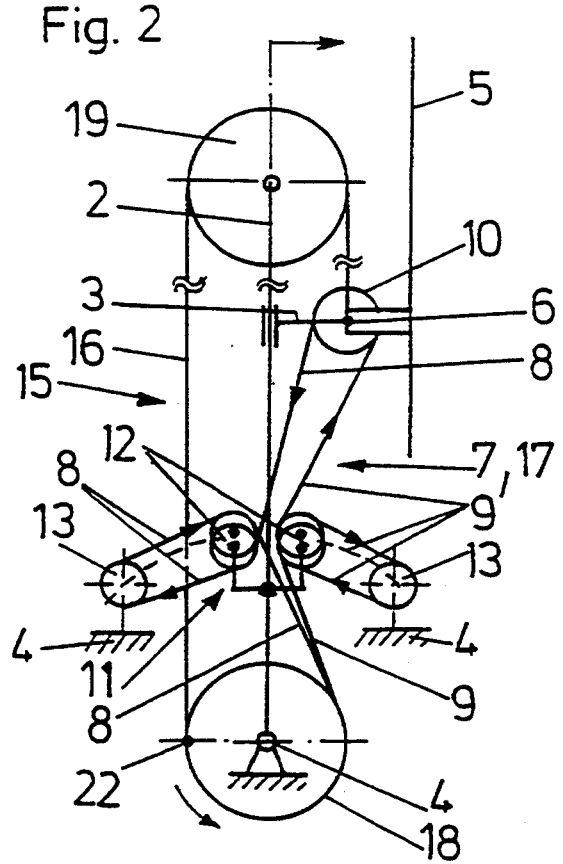
Figure 13:
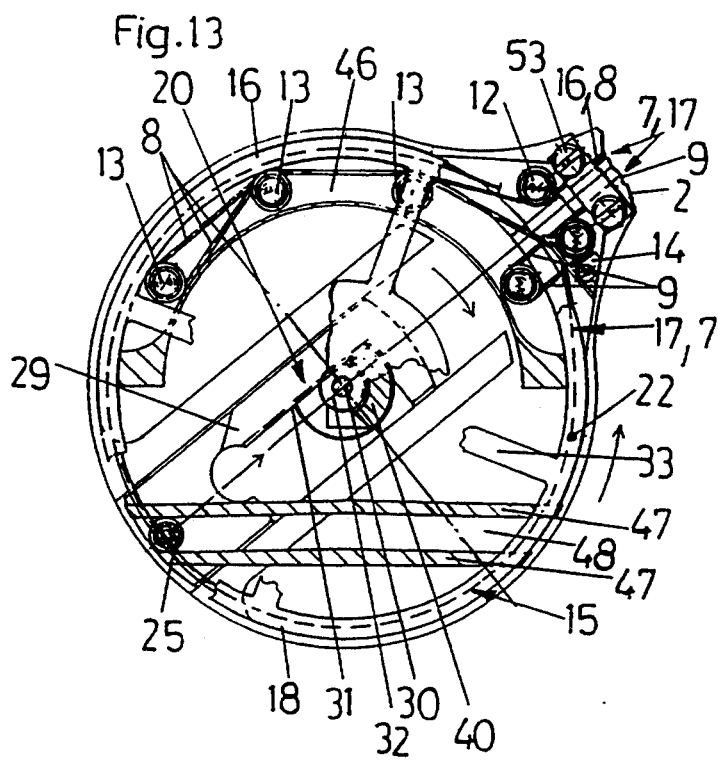

FIG. 2 to 15 illustrate the configuration of the two cable lines 7 and 15 which are explained in more detail by means of the schematic illustrations of FIGS. 2 and 3, the illustration being limited to the necessarily required parts.

The first cable line 7 includes two cable segments 8 and 9 and it serves to pivot the wiper blade 5 in the pivot bearing 6 during the oscillation of the wiper arm. The second cable line 15 includes a push-out line 16 and a pull-in line 17 and it serves to shift the wiper arm member 3 in the pivoted wiper arm member 2. This second cable line 15 is guided about a driven first cable pulley 18, which is mounted in the pivot bearing 4, and about a second cable pulley 19, which is mounted on the pivoted wiper arm member 2, and it is attached at the shiftable wiper arm member 3. In principle, therefore, the second cable line 15—with the intermediary of the shiftable wiper arm member 3—is closed in itself. A rotation of the first cable pulley 18 thus causes the wiper arm member 3 to be extended or to be drawn in.

In order for the wiper blade 5 to be pivoted relative to the wiper arm in dependence on the pivot angle, the first cable line 7 is guided about a pulley 10 associated with the pivot bearing 6 and about a basic part effecting the pivoting, whereby a cable storage is available for the sections of the two cable lengths 8 and 9 corresponding to the wiper arm length difference. In principle, the first cable line 7 is closed in itself as well. Instead of the theoretically required four cable segments (two per cable line), only three cable segments are required, because the first cable line 7 is integrated in the second cable line 15 and forms its draw-in cable 17. In other words, the draw-in cable 17 is formed as a double cable, which comprises the two mutually adjacent cable segments 8 and 9. When the driven first cable pulley 18 is rotated, the two cable segments 8 and 9 are guided about the cable pulley 18, a peripheral segment of which forms the cable storage for the segments of the two cable lengths 8 and 9 to be stored. Depending on the position of the extendable wiper arm member 3, only the second cable line 7 (FIGS. 12, 13), or the first cable line 15 (FIG. 11) as well, lies at the cable-storing peripheral segment of the pulley. The object of the first cable line 7, namely the relative pivoting of the wiper blade 5 is not hindered thereby, since both cable lengths 8 and 9 are always pulled in or given off by an equal length at the cable-storing peripheral segment of the cable pulley 18. The basic member which is responsible for the relative pivoting of the wiper blade 5 and from which the cable lengths 8 and 9 extend to the pulley 10 like a parallel guide, includes a device for variable loop formation 11. The device illustrated in FIGS. 2 and 3 is comprised, per cable length 8 and 9, of a first guide roller 13 disposed at the pivot bearing 4 and of two second guide rollers 12 disposed at the pivoted wiper arm member 2. The two second guide rollers 12 are illustrated mutually overlapping in FIGS. 2 and 3 for the purpose of clarity; preferably, however, as can be seen from FIGS. 4a and 11 to 14, they are disposed coaxially one above the other. When the wiper arm (FIGS. 2, 3) is pivoted, the cable lengths 8 and 9 are extended or shortened by an amount required for rotating the pulley 10. The section lengths shown in FIGS. 2 and 3, however, are chosen longer for better clarity and they would rotate the pulley 10 to an undesired degree. This extra length is intentionally used in the preferred embodiment according to FIGS. 4 to 15, and it is equalized by a reducer 23 disposed between the pulley 10 and the pivot bearing 6 of the wiper blade 5. Due to the hoist-like cable run in the device for variable loop formation 11, which can be effected several times if necessary, forces acting on the wiper blade 5 are transferred at a reduced amount onto the driven first cable pulley 18 and a transmission gearing 20 operatively connecting the cable pulley to the pivot drive of the wiper arm. Due to the fact that the diameter of the cable pulley 18 cannot be chosen arbitrarily large, the transmission of the pivot drive increases the pivot angle of the driven cable pulley 18 and thus its cable-storing peripheral segment, the length of which defines the maximum extension length of the wiper arm member 3.

FIGS. 2 and 3 also show that only a single cable is needed for the two cable lines 7 and 15; a first end thereof is attached at the extendable wiper arm member 3, i.e. at a tension spring 21 (FIG. 11) disposed thereat, the single cable is guided via the second cable pulley 19 and the driven first cable pulley 18 to the pulley 10 and back to the driven cable pulley 18, whereby that segment traverses the device for the variable loop formation twice; a second end of the single cable is attached at a point 22 of the driven cable pulley, which is disposed at a distance from the entry location of the cable end at least by the length of the cable-storing peripheral segment. Since at or near this point 22 the push-out cable 16 can be fixed to the driven first cable pulley 18 in order to prevent its sliding through, two cables could be used as well. One cable would then lead from the fixed point 22 to the fixed point at the extendable wiper arm member 3, i.e. at the tension spring 21, and the other cable would by laid from the fixed point 22 at the cable pulley 18 via the pulley 10 and back to the fixed point 22.

Figure 10:
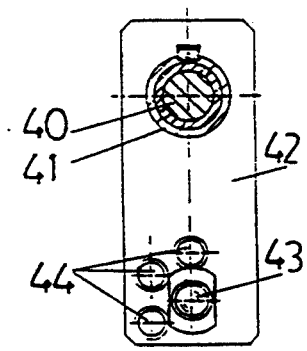
FIG. 10 is a section according to the line X—X in FIG. 9, FIGS. 11 to 13 are sections through the pivot bearing according to the line XI—XI in FIG. 9, illustrated in three different positions of the wiper arm.
Figure 14:
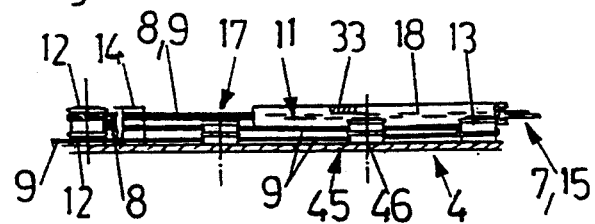
FIG. 14 shows a partial section according to the line XIV—XIV in FIG. 12.

As shown in detail in FIGS. 4 to 15, the pivot bearing 4 of the wiper arm includes a bearing trunnion 40 carrying a hollow shaft 41 with a crank arm 42, at which the pivot drive engages in a conventional manner. Several bores 44 are provided at the crank arm 42 for mounting a crank pin 43, so that various pivot angles can be attained (FIG. 10). The bearing trunnion 40 non-rotatably carries a basic body 45 at an upper end thereof, as well as a mounting bore 24 for a drive shaft 30 of the driven first cable pulley 18. The basic body 45 has the approximate shape of a disk and it is provided, at the circumferential half facing the wiper arm, with a downwardly stepped edge region 46 and, at the oppositely disposed circumferential half, with chord-like guide ridges 47 which project downwardly (FIGS. 4a, 11). The two guide ridges 47 delimit a groove 48, into which a guide pilot 25 of the transmission gearing 20 reaches.

A transmission housing 26 is non-rotatably connected with the hollow shaft 41, which housing forms the lower-most part of the pivoted wiper arm member 3 and thus is pivoted together with the wiper arm. The base plate 27 of the housing 26 is provided with a diametrically extending guide groove 28 in which a slide 29 slides. The slide 29 carries a guide crank 25 which reaches into the groove 48 of the basic body 45 and which is preferably provided with a roller. As can be seen from FIGS. 11 to 13, rotating the transmission housing 26 causes the slide 29 to slide back and fro. This alternating movement is translated to the alternating rotary motion of the cable pulley 18 via a spur rack 31 formed at the slide 29 and a pinion 32 formed at the drive shaft 30 of the driven first cable pulley 18. The cable pulley 18, whose periphery carrying the cable groove is held through spokes 33 by a nave disposed on the drive shaft 30, lies above the basic body 45 and overlaps the same partially (FIGS. 4a, 9). The cable pulley 18 and the basic body 45 are only indicated in FIGS. 11 to 13, so that the lower-lying transmission gearing 20 can be better illustrated.

Figure 15:
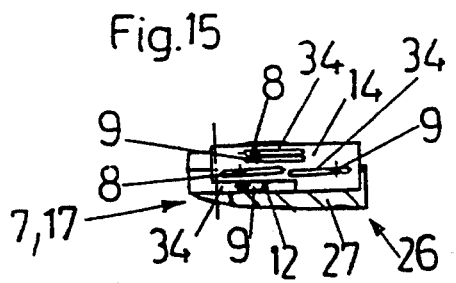
FIG. 15 shows a partial section according to the line XV—XV in FIG. 11, and FIGS. 16 and 17 are schematic illustrations of the two cable lines in a second embodiment.

The stepped edge region 46 of the basic body carries six first guide rollers 13, which are partially disposed in pairs above one another. Four second guide rollers 12, which are disposed in overlying pairs on mounting pins extending upwardly from the base plate 27 of the transmission housing 26, together with the six guide rollers 13, form the device for variable loop formation 11, through which the two cable lengths 8 and 9 of the first cable line 7 are guided, and which form the basic part for pivoting the wiper blade 5. The configuration of the draw-in cable 17 through the right-hand half (in FIG. 12) of the device for loop formation 11, is detailed in FIGS. 14 and 15. The two cable lengths 8 and 9 project through the two uppermost (in FIG. 15) slits 34 of a cable guide plate 14 mounted on the base plate 17, and together they wrap around the upper second guide roller 12, from which the cable length 8 transits through the left-hand central slit 34 to the left half of the device 11, and from which the cable length 9 extends through the right-hand central slit 34 via the following three or more first guide rollers 13 and back to the lower second guide roller 12, whereby it is guided through the open lower slit 34 of the cable guide plate 14 (FIG. 15). From the lower guide roller 12 the cable length 9 extends to the pulley 10 at the free end of the extendable wiper arm member 3, as can be seen from FIGS. 5 and 7. Catch bodies 35 are provided at the segment of the cable line 7 which cooperates with the pulley 10 and which becomes the second cable length 8; the catch bodies engage in a formlocking manner in corresponding peripheral indentations at the pulley 10. As shown in FIG. 4b, the pulley 10 is articulated in a carrier plate 36 at the extendable wiper arm member 3 and connected with a pinion 37, which drives a gear wheel 38, also mounted in the carrier plate 36. A pinion 39 is in turn associated with the gear wheel 38 and meshes with a further gear wheel 51 of the pivot bearing 6 of the wiper blade 5. The gear wheel 51 is also mounted in the carrier plate 36 and it is non-rotatably fixed at a wiper blade mount. The pinions 37 and 39, and the gear wheels 38 and 51, are components of the step-down transmission 23, whereby the pivot angle of the wiper blade 5 relative to the wiper arm can be adapted to various shapes of the vehicle windshield 1 by suitable, exchangeable gear wheel sets.

The extendable wiper arm member 3, as can be seen from FIG. 7, is formed as a flat channel and it is guided on the pivoted wiper arm member 2 by means of two ball races 52, and the wiper arm member 2 is formed as a flat rail which slides in the channel. The rail forming the wiper arm member 2 is mounted in the housing 26 by means of bolts 52 and it is preferably made from a springy material, so that a joint is obviated. As indicated in FIGS. 4a, 7 and 11, a bellows 54 or the like may be provided between the transmission housing 26 and the extendable wiper arm member 3. Instead of the bellows 54 it would also be possible for a jacket tube to extend from the transmission housing 26 having approximately the length of the pivoted wiper arm member 2 from which the extendable wiper arm member 3 is drawn out. In that case, a seal is provided between the free end of the jacket tube and the wiper arm member 3.

Figure 16:
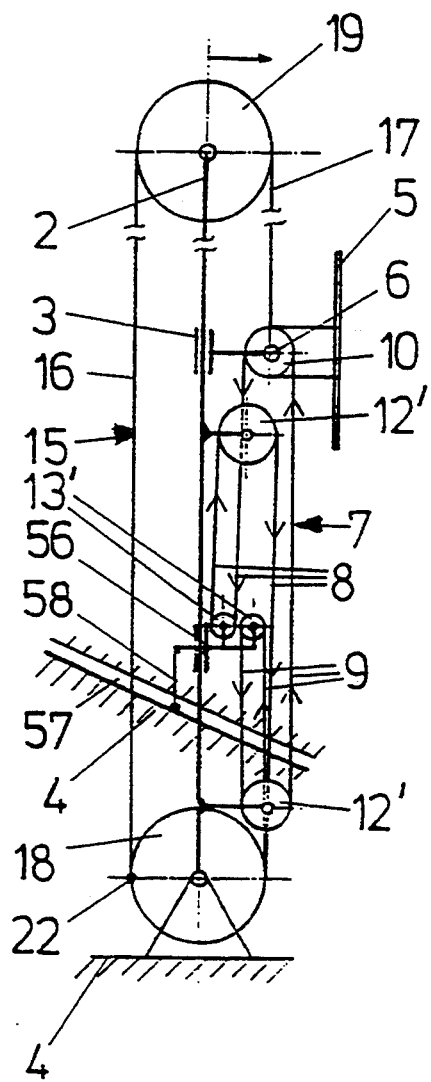
Figure 17:
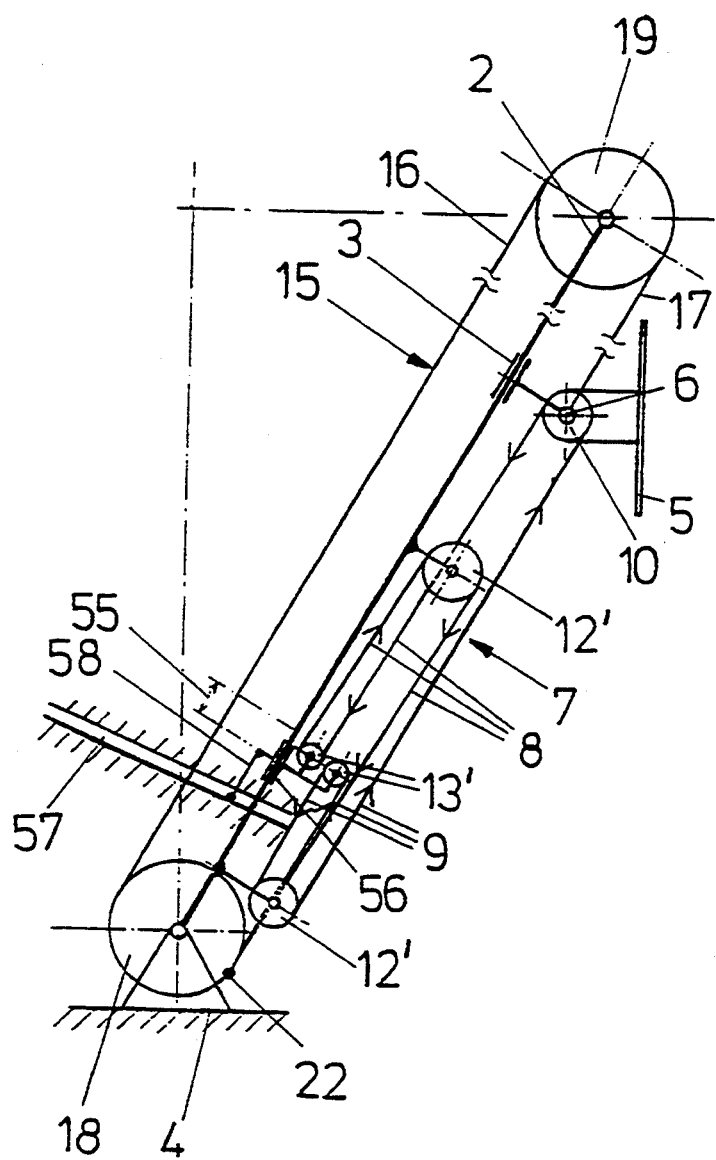

FIGS. 16 and 17 show schematic illustrations of the configuration of the two cable lines 7 and 15 in a second embodiment. The configuration of the second cable line 15 corresponds to the first embodiment according to FIGS. 2 and 3. The cable line 7, on the other hand, is not guided about pivot bearing-stationary first guide rollers, but instead, all of the guide rollers 12' and 13' are disposed on the pivoted wiper arm member 2. Again, the second guide rollers 12' are mounted on rigid roller bearings. The first guide rollers 13', on the other hand, are disposed on a roller carrier 56 which is longitudinally shiftable on the pivoted wiper arm member 2. The shifting of the two first guide rollers 13' thereby happens in dependence of a, preferably plane, control surface 57 formed on the pivot bearing 4 along which a guide pin 58 of the roller carrier 56 is guided. As can be seen, the control surface extends obliquely relative to the central position of the wiper arm (FIG. 16), so that the roller carrier 56 is shifted by the measure 55 (FIG. 17) when the wiper arm is pivoted, so that the pulley 10 is rotated.

I claim:

1. A windshield wiper system, comprising:
a pivot bearing;
a pivotable wiper arm including a pivoted wiper arm member and a telescopic wiper arm member telescoptically shiftable on said pivoted wiper arm member, said telescopic wiper arm member having a free end disposed distally of said pivoted wiper arm member, said pivoted wiper arm member being attached to said pivot bearing and being pivotable about a wiper arm pivot axis;
a wiper blade pivotally mounted about an axis parallel to the wiper arm pivot axis at said free end of said telescopic wiper arm member and guidable transversely across a windshield; a wiper blade pulley connected with said wiper blade for pivoting said wiper blade relative to said wiper arm;
said pivot bearing including a stationary basic part being stationary relative to the windshield and having said pivoted wiper arm member pivotally attached thereto;
a first cable line with two cable segments extending between said wiper blade pulley and said stationary basic part, means for varying respective lengths of the two cable segments relative to one another and causing said wiper blade to pivot relative to said wiper arm when said wiper arm is pivoted;
a driveable first cable pulley rotatably mounted in said pivot bearing of said wiper arm and a second cable pulley rotatably disposed on said pivoted wiper arm member at a constant distance from said first cable pulley;
extending means for extending said telescopic wiper arm member from said pivoted arm member, said extending means including a second cable line defining a draw-out cable portion guided from said driveable first cable pulley, via said second cable pulley, to said telescopic wiper arm member, and contracting means for contracting said telescopic wiper arm member toward said pivoted arm member; said contracting means including a draw-in cable portion guided from said telescopic wiper arm member to said driveable first cable pulley; and cable storage means for selectively receiving and issuing a part of each of said cable segments of said first cable line corresponding to a length by which said wiper arm is extended;
said first cable line being formed in one of said draw-out cable portion and said draw-in cable portion of said extending means and said contracting means.

2. The windshield wiper system according to claim 1, wherein said cable storage means for said first cable line are defined by a segment on a periphery of said driven first cable pulley of said second cable line.

3. The windshield wiper system according to claim 1, wherein said varying means include a device for variable loop formation, said device including a plurality of first guide rollers operatively coupled with said pivot bearing and a plurality of second guide rollers disposed on said pivoted wiper arm member, said two cable segments of said first cable line being guided through said device for variable loop formation, and said first and second guide rollers moving relative to one another when said wiper arm is pivoted for effecting a pivoting of said wiper blade relative to said wiper arm.

4. The windshield wiper system according to claim 3, wherein said plurality of first guide rollers are disposed along an arc on said stationary basic part of said pivot bearing.

5. The windshield wiper system according to claim 3, including a control surface formed on said pivot bearing and a guide pin operatively coupled with said plurality of first guide rollers, said plurality of first guide rollers being shiftably disposed on said pivoted wiper arm member and being movable relative to said plurality second guide rollers by said guide pin guided along said control surface.

6. The windshield wiper system according to claim 1, including a transmission gearing disposed between said pivot bearing and said driveable first cable pulley of said second cable line.

7. The windshield wiper system according to claim 6, wherein said transmission gearing includes a pinion formed at said first cable pulley, said pivot bearing having a chord-like guide track formed therein, and a toothed slide for driving said first cable pulley, said toothed slide meshing with said pinion and being forcibly guided in said pivoted wiper arm member and along said chord-like guide track of said pivot bearing via a guide pilot received in said guide track.

8. The windshield wiper system according to claim 1, including a first point defined at a cable end of said draw out cable portion at said telescopic wiper arm member, a plurality of first guide rollers disposed on said basic part and a plurality of second guide rollers disposed on said wiper arm, and a second point defined at said driven first cable pulley, said first and second cable lines being formed by a single cable, said single cable defining:

said draw-out cable portion being fixed to and guided from said first point at said telescopic wiper arm member, via said second cable pulley, to said driveable first cable pulley, and said draw-in cable portion including said two cable segments of said first cable line and being guided from said draw-out cable portion at said driveable first cable pulley, via one of said first guide rollers and one of said second guide rollers to said wiper blade pulley, and via another one of said first guide rollers and another one of said second guide rollers, back to said second point at said driveable first cable pulley where said draw-in cable portion is fixed.

9. The windshield wiper system according to claim 8, wherein said draw-in cable is guided between said first cable pulley and said one of said first guide rollers via a further one of said second guide rollers, and between said wiper blade pulley and said other one of said first guide rollers via a further one of said second guide rollers.

10. The windshield wiper system according to claim 8, wherein said draw-in cable is guided between said first cable pulley and said one of said first guide rollers via a further one of said second guide rollers, and between said wiper blade pulley and said other one of said first guide rollers via a further one of said second guide rollers.

11. The windshield wiper system according to claim 1, including a tension spring for attaching a first cable end of said draw-out cable portion to said telescopic wiper arm member.

12. In a windshield wiper system for a passenger vehicle with a windshield, of the type in which a pivotable wiper arm is articulated about a wiper arm pivot axis defined by a pivot bearing stationarily disposed on a passenger vehicle; in which the wiper arm includes a pivoted wiper arm member and a telescopic wiper arm member telescopically shiftable on the pivoted wiper arm member; in which a wiper blade is pivotal about an axis parallel to the wiper arm pivot axis and mounted at a free end of the telescopic wiper arm member and guidable transversely across a windshield; in which a wiper blade pulley is connected with the wiper blade for pivoting the wiper blade relative to the wiper arm such that the wiper blade can laterally traverse the windshield in a substantially parallel movement and wiper substantially a full surface of the windshield; in which a first cable line with two cable segments extends between the wiper blade pulley and the pivot bearing such that the first cable line causes the wiper blade to pivot relative to the wiper arm as the wiper arm is pivoted; in which cable storage means are provided for selectively receiving and issuing a length of each of the cable segments of the first cable line corresponding to a length by which the wiper arm is extended; the improvement which comprises: a driven first cable pulley mounted in the pivot bearing of the wiper arm and a second cable pulley disposed on the pivoted wiper arm member at a constant distance from said first cable pulley; extending means for extending the telescopic wiper arm member from the pivoted arm member, said extending means including a second cable line defining a draw-out cable portion guided from said driven first cable pulley, via said second cable pulley, to the telescopic wiper arm member, and contracting means for contracting said telescopic wiper arm member toward said pivoted arm member, said contracting means including a draw-in cable portion guided from the telescopic wiper arm member to said driven first cable pulley; and said first cable line being formed in one of said draw-out cable and said draw-in cable portion of said extending means and said contracting means.

* * * * *